Figure 1:
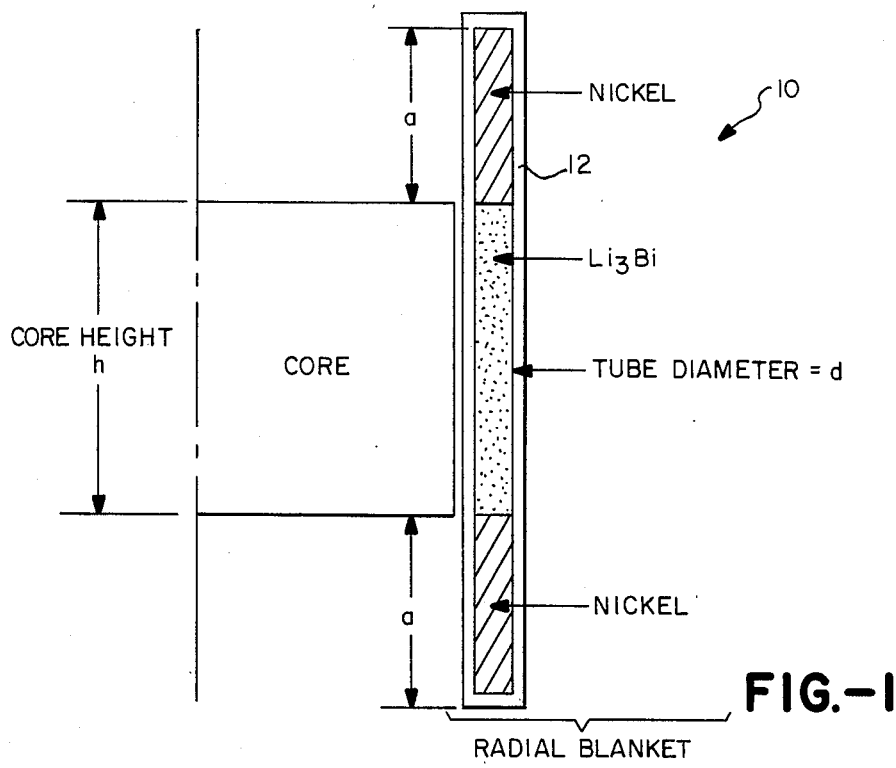

United States Patent [19]
Kim et al.

[11] Patent Number: 4,663,111
[45] Date of Patent: May 5, 1987

[54] SYSTEM FOR AND METHOD OF PRODUCING AND RETAINING TRITIUM

[75] Inventors: Jong H. Kim; Walter B. Loewenstein, both of Palo Alto, Calif.

[73] Assignee: Electric Power Research Institute, Inc., Palo Alto, Calif.

[21] Appl. No.: 790,751

[22] Filed: Oct. 21, 1985

Related U.S. Application Data

[63] Continuation of Ser. No. 444,076, Nov. 24, 1982, abandoned.

[51] Int. Cl.$^4$ ............................................. G21G 1/02
[52] U.S. Cl. ................................. 376/185; 376/189; 376/202
[58] Field of Search ........ 376/185, 189, 146, 312–314, 376/202

[56] References Cited

U.S. PATENT DOCUMENTS

| | | | |
|---|---|---|---|
| 3,079,317 | 2/1963 | Jenks et al. | 376/202 |
| 3,848,067 | 11/1974 | Cooper | 376/314 |
| 3,963,826 | 6/1976 | Anderson et al. | 376/314 |
| 4,244,783 | 1/1981 | Corbett et al. | 376/313 |

FOREIGN PATENT DOCUMENTS

| | | | |
|---|---|---|---|
| 2208100 | 9/1973 | Fed. Rep. of Germany | 376/146 |
| 2631028 | 5/1978 | Fed. Rep. of Germany | 376/146 |

OTHER PUBLICATIONS

Fusion Energy Update, 7/82, p. 29, Abs. #3559.
Nuclear Technology, 1/74, vol. 21, pp. 39–49, Hickman.
Atomic Energy Review, 6/80, vol. 18, No. 2, pp. 555–561.
Nuclear Fusion, Special Suppl., 1974, pp. 363–376, Hiraoka et al.
UWFDM-317, 10779, Moses, pp. 26–32.

*Primary Examiner*—Harvey E. Behrend
*Attorney, Agent, or Firm*—Flehr, Hohbach, Test, Albritton & Herbert

[57] ABSTRACT

A means for and method of producing and retaining tritium utilizing lithium bismuth and nickel is disclosed herein. The lithium bismuth serves to produce the tritium when exposed to neutrons. The nickel serves to dissolve and thereby retain the tritium which is produced by the lithium bismuth. As disclosed herein, both of these materials are contained within a common tubular housing which is pervious to the neutrons but impervious to any tritium which is produced therein.

8 Claims, 2 Drawing Figures

SYSTEM FOR AND METHOD OF PRODUCING AND RETAINING TRITIUM

This is a continuation of application Ser. No. 444,076 filed Nov. 24, 1982, now abandoned.

The present invention relates generally to the production of tritium and more particularly to a specific way of producing the tritium as well as a specific way of retaining it.

One of the most promising prime fuels in fusion reaction is deuterium-tritium (D-T) fuel, and for this reason, tritium breeding has been given much attention in fusion reactor design. Some of the conceptual studies for tritium breeding can be found in the following publications:

- G. H. MILEY, *Fusion Energy Conversion,* American Nuclear Society, LaGrane Park, Ill. (1976).
- R. J. DeBELLIS and Z. A. SABRI, "Fusion Power: Status and Options", EPRI ER-510-SR, Electric Power Research Institute (June 1977).
- "STARFIRE—A Commercial Tokamak Fusion Power Plant Study", ANL/FPP-80-1, Vol. 1, Argonne National Lab. (Sep. 1980).
- "NUWMAK, A Tokamak Reactor Design Study", UWFDM-330, University of Wisconsin (Mar. 1979).

An important aspect of the D-T fuel cycle is that a lithium blanket is required to breed tritium as an integral part of the fusion reactor. On the other hand, it is also possible to produce tritium separately by subjecting lithium to neutron irradiation as described for example in U.S. Pat. Nos. 3,100,184 or 3,079,317. The production of tritium by means of neutron irradiation is also discussed in U.S. Pat. Nos. 3,037,922; 3,510,270; and 3,791,921.

As will be seen hereinafter, the present invention is also concerned with the production of tritium by means of neutron irradiation and, accordingly, one object of the present invention is to produce tritium in an efficient and yet uncomplicated and reliable manner.

Another object of the present invention is to provide an uncomplicated and yet reliable way of retaining the tritium once it is produced.

A more particular object of the present invention is to provide an efficient tritium breeding material, an efficient tritium retaining material and reliable means for containing both in a way which allows each to function efficiently in its intended manner.

As will be seen hereinafter, for the reasons to be discussed, the preferred material selected to produce the tritium is lithium bismuth and the preferred material selected to retain the tritium once produced is nickel. These two materials are preferably contained in a common tubular housing which is pervious to neutrons, at least to a limited extent, and impervious to tritium. In this way, the entire tubular housing can be placed in an appropriate location within a nuclear reactor for exposing the lithium bismuth to the neutrons produced by the reactor. The nickel can be placed in sufficiently close vicinity to the lithium bismuth to dissolve and thereby retain any tritium produced by the lithium bismuth as a result of this bombardment of neutrons.

Figure 2:
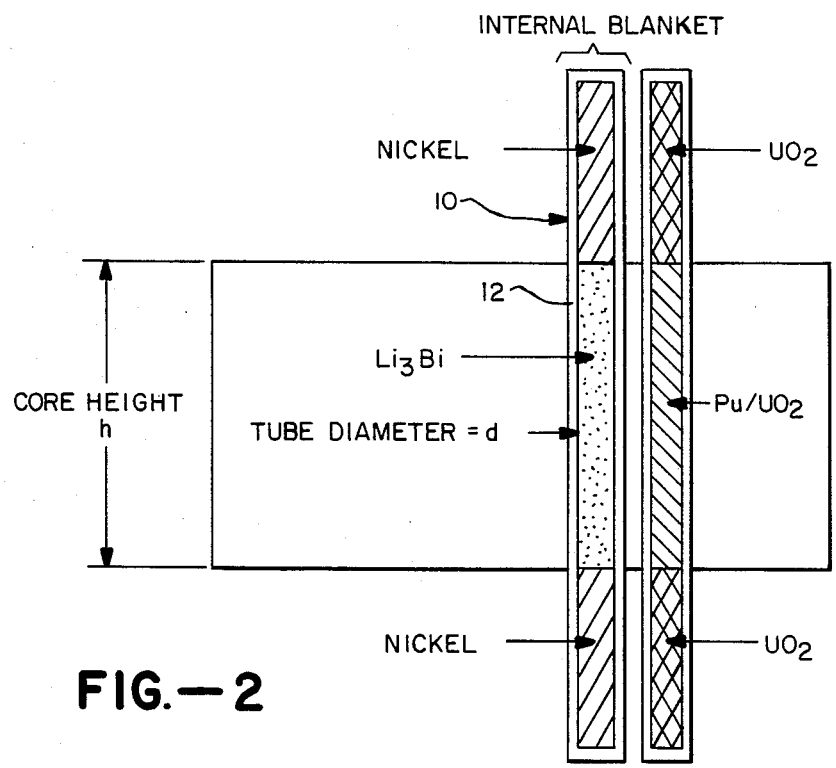

The present invention will be described in more detail hereinafter in conjunction with the drawing wherein:

FIG. 1 diagrammatically illustrates the core of a fast breeder nuclear reactor in combination with an assembly for producing and retaining tritium as a result of the presence of neutron flux from the reactor; and FIG. 2 is a view similar to FIG. 1 but showing the tritium producing and retaining assembly in a different position relative to the reactor core.

As indicated above, the present invention is directed to a system for and method of producing and retaining tritium. This is specifically accomplished by neutron irradiation and in a specific embodiment by means of a free source of neutron flux from a fast breeder type nuclear reactor or the like. The present approach utilizes a first material for producing the tritium and a second material for retaining it. As will be seen hereinafter, in the particular embodiment disclosed, both of these materials are located in a high temperature environment, specifically the core of the nuclear reactor just mentioned where the coolant temperature can reach 600° C. during normal operations and a couple of hundred degrees higher during some transients. In addition, each material in order to function in the manner intended must be maintained in a solid condition. As a result, both of these materials must have sufficiently high melting points to remain solid in the intended environment. The tritium producing material should be one which is capable of producing a relatively large amount of tritium for its weight and size in order to be economical and practical and it should melt congruently, i.e., like an element (that is without eutectic). At the same time, the tritium retaining material should be one which is capable of retaining all of the tritium which is produced. In a preferred embodiment, this latter material is one which efficiently dissolves the tritium and specifically a material which is capable of dissolving and retaining relatively large amounts of tritium for its size. The preferred tritium producing and retaining materials are lithium bismuth ($Li_3Bi$) and nickel (Ni), respectively.

When lithium is subjected to the neutron flux in a nuclear reactor and thereby bombarded with neutrons, this results in the production of tritium. The postulated reaction is as follows:

$$_3Li^6 + _0n^1 \rightarrow _2He^4 + _1H^3 \qquad (1)$$

There are a number of different lithium alloys which have been evaluated as possible candidates for the tritium producing material referred to above. A number of these candidates including the preferred one, specifically lithium bismuth, are set forth in Table I below along with their respective melting points, molecular weights, density and the atomic density of lithium. The density and atomic density values set forth in this table are calculated values but the melting points were taken from a handbook. Because the tritium producing material is intended for use in a high temperature environment, only those alloys having sufficiently high melting points and ones which melt congruently, i.e., like an element (without eutectic) have been selected as preferred materials. These include all of the ones listed in Table I. There are other lithium alloys which, but for their lower melting points, might also be satisfactory. Since the atomic density of all these materials are the same order of magnitude (approximately  $10^{22}$ atoms/cm$^3$), lithium bismuth was selected as the preferred material. This selection was made on the basis of its exceptionally high melting point.

TABLE I
PROPERTIES OF LITHIUM ALLOYS

| ALLOYS | MELTING PTS (°C./°F.) | "MOLECULAR" WEIGHT | DENSITY (gr/cm³) | ATOMIC DENSITY OF LITHIUM (ATOMS/cm³) |
| --- | --- | --- | --- | --- |
| Li-Al | 718/1324 | 33.92 | 1.469 | $0.0261 \times 10^{24}$ |
| Li₃Bi | 1145/2093 | 229.8 | 3.792 | $0.0298 \times 10^{24}$ |
| LiCd | 549/1020 | 119.35 | 8.47 | $0.0427 \times 10^{24}$ |
| Li₇Pb₂ | 726/1339 | 462.99 | 3.61 | $0.0329 \times 10^{24}$ |
| Li₂Si | 760/1400 | 41.97 | 1.624 | $0.0466 \times 10^{24}$ |
| Li₄Sn | 765/1409 | 146.45 | 2.13 | $0.035 \times 10^{24}$ |
| Li₇Sn | 783/1441 | 285.97 | 2.3 | $0.0337 \times 10^{24}$ |

Having selected the preferred material for producing the tritium in accordance with the reaction equation (1) above, it is necessary to provide some means for capturing and retaining the tritium that is produced. If bismuth had a high affinity with hydrogen, it would be the ideal choice as a material to capture the tritium since no separate material would be needed. However, bismuth apparently does not normally form a stable compound with hydrogen. This is also apparently the case with respect to the other elements composing the lithium alloys listed in Table I above. More specifically, neither bismuth nor the other elements combined with lithium in Table I above are believed to possess a desirable high affinity with hydrogen at the relatively high but typical temperatures of a reactor environment, especially a fast breeder reactor. Thus, it is necessary to use a separate material for capturing and containing the tritium produced by the lithium bismuth. As indicated above, the preferred material is nickel.

While a number of materials were studied as possible candidates for capturing and retaining the tritium produced by lithium bismuth, nickel was finally selected as the preferred one for a number of reasons. First, nickel is known for its ability to dissolve hydrogen and it also has a compatible melting point, specifically the relatively high melting point of 1453° C. In addition, nickel has the extremely desirable property that solubility of tritium in nickel increases with increasing temperatures. Some of the properties of nickel pertinent to the present invention in addition to its melting point are set forth in Table II directly below.

TABLE II

| | |
| --- | --- |
| Melting point: | 1453° C. |
| Atomic density: | $0.0913 \times 10^{24}$ atom/cm³ |
| Solubility of tritium at 3 bars: | 0.0195 at. % at 600° C. |
| | 0.0296 at. % at 800° C. |
| | 0.0396 at. % at 1000° C. |
| | 0.0489 at. % at 1200° C. |
| | 0.0573 at. % at 1400° C. |

The solubility of tritium in nickel was calculated from the formula given in the following publication and then properly converted to atomic percent. The publication is N. J. HAWKINS, "Solubility of Hydrogen Isotopes in Nickel and Type 347 Stainless Steel", KAPL-868, General Electric Co. (Apr. 1953).

Having selected the preferred tritium producing material, e.g. lithium bismuth, and the preferred tritium capturing and retaining material, e.g. the nickel, it may be necessary to determine the amount of nickel required to absorb all of the tritium that would be produced from the lithium bismuth. As will be described hereinafter, the lithium bismuth and the nickel are placed together in a stainless steel blanket (tubular container) in the preferred embodiment and located in a nuclear reactor, specifically a fast breeder reactor, in the appropriate position for exposing the lithium bismuth to neutron flux. In order to economize the size of this blanket, the volume of nickel required should not be too large compared to the volume of lithium bismuth. In order to determine the amount of nickel required to absorb all the tritium which is produced from the lithium bismuth under these circumstances, a simple, first order calculation can be made. First, the amount of tritium production can be computed from the following equation:

$$N(_1H^3) = N(_3Li^6)\sigma\phi t. \qquad (2)$$

Where $N(_1H^3)$ is the number of tritium atoms produced per cm³ of lithium bismuth, $N(_3Li^6)$ is the atomic density of $_3Li^6$ in natural lithium (atom per cm³). $\sigma$ is the cross section of $_3Li^6$(barn). $\phi$ is the neutron flux (neutrons/cm² sec.), and t is the cycle of reactor operation (sec).

The abundance of $_3Li^6$ in natural lithium is 7.5 atomic% so that $N(_3Li^6) = 0.075 N(Li)$, where $N(Li)$ is the atomic density of lithium in lithium bismuth. In the present calculations, the following nominal values have been used to obtain $N(_1H^3)$ . . . $N(Li) = 0.0298 \times 10^{24}$ atom/cm³, $\sigma = 1$ barn, $\phi = 10^{13}$ neutrons/cm² sec, and t = 3 yr. With optimized design, the $\sigma\phi$ can be enhanced significantly.

Using the above values and $N(_3Li^6) = 0.075 N(Li)$ in the last equation recited above, the amount of tritium production can be calculated to be $N(_1H^3) = 2.1145 \times 10^{18}$ atoms/cm³ of lithium bismuth. Finally, the volume of nickel required to dissolve the above amount of tritium was determined from:

$$V(Ni) = \frac{N(_1H^3)}{N(Ni)\epsilon}, \qquad (3)$$

where $V(Ni)$ is the volume of nickel needed to dissolve the tritium produced per cm³ of Li₃Bi, $N(_1H^3)$ is the amount of tritium produced per cm³ of Li₃Bi ($= 2.1145 \times 10^{16}$ atom/cm³ of Li₃Bi from the previous calculation), $N(Ni)$ is the atomic density of nickel ($= 0.0913 \times 10^{24}$ atom/cm), and $\epsilon$ is the solubility of tritium in nickel (conservatively take $\epsilon = 0.02$ atomic%). From these, $V(Ni) = 0.116$ cm³ of nickel per cm³ of Li₃Bi.

With a value of $\sigma\phi$ ten times as high, the volume of nickel required will be still comparable to that of Li₃Bi.

Having described the preferred tritium producing material and the preferred tritium capturing and retaining material for use in the present assembly for producing and retaining tritium, attention is now directed to an actual physical assembly which is generally indicated in FIG. 1 by the reference numeral 10. This assembly includes a sealed stainless steel tube 12 which is pervious to neutrons, to a limited extent, while it is at the same time impervious to tritium. The interior of this tube is filled with a central layer of lithium bismuth sandwiched between layers of nickel. This entire assembly is positioned within the radial blanket of the fast breeder reactor in sufficiently close vicinity to its core such that the lithium bismuth is subjected to neutron flux produced as a result of the operation of the reactor. This, in turn, causes the lithium to produce the tritium in accordance with the first recited equation above. Since the stainless steel container 12 is pervious to neutrons, at least to a limited extent, this reaction is allowed to take place. At the same time, since the tritium produced cannot pass through the stainless steel, it is locked within the tube. As a result, it diffuses into contact with and is dissolved by the nickel on opposite sides of the lithium bismuth.

FIG. 2 illustrates the same assembly 10 positioned within the core. In either embodiment, the typical core height H is approximately 3-4 feet. Dimensions a, d and the number of assemblies (tubes) used are floating parameters which may be determined by the demand of tritium to be produced.

While assembly 10 has been described in conjunction with a fast breeder reactor, it is to be understood that the present invention is not limited to this particular combination. For example, the same assembly could be utilized in, for example, light water reactors. In this case, however, the tubing containing the lithium bismuth and nickel can be relatively more parasitic than in fast breeder applications. More specifically, in these latter fast breeder applications, there is such a large amount of neutron flux produced that a sufficient amount is able to penetrate the stainless steel tube 12 to produce the desired amount of tritium even though stainless steel is not highly pervious to neutrons (but nevertheless pervious to a limited degree). In the case of light water reactors, there may not be sufficient neutron flux to penetrate stainless steel tubes for producing the desired amount of tritium and therefore another more neutron pervious material than stainless steel may be selected. Of course, it is not necessary at all to the present invention to use a nuclear reactor for providing the necessary source of neutrons, although it is preferred since such a source is free. Finally, while the tubular configuration illustrates is preferred, it is not intended to limit the present invention.

What is claimed is:

1. An arrangement for producing tritium and retaining substantially all of the tritium so produced within the environment of a fast breeder reactor which provides a supply of neutron radiation during operation thereof, said arrangement comprising:
    (a) means forming part of said fast breeder reactor for producing neutron radiation;
    (b) a housing which is pervious to said neutron radiation at least to a limited extent and substantially impervious to tritium, said housing being located within said fast breeder reactor such that its interior is subjected to said neutron radiation during production thereof within said reactor;
    (c) a volume of lithium bismuth material contained within said housing and thereby subjected to said neutron radiation during the production thereof, whereby to produce tritium; and
    (d) a sufficiently large volume of nickel material contained within said housing and disposed sufficiently close to said lithium bismuth so as to retain substantially all of the tritium produced by said lithium bismuth.

2. An arrangement as in claim 1, wherein the volume of nickel relative to the lithium bismuth material is defined by the relationship:

$$V(Ni) = \frac{N(_1H^3)}{N(Ni)\epsilon}$$

where $V(Ni)$ is the volume of nickel material needed to dissolve the tritium produced per $cm^3$ of $Li_3Bi$, $N(_1H^3)$ is the amount of tritium produced per $cm^3$ of $Li_3Bi$, $N(Ni)$ is the atomic density of nickel material, and $\epsilon$ is the solubility of tritium in nickel.

3. An arrangement as in claim 1, wherein said housing is formed from a sealed stainless steel tube.

4. An arrangement as in claim 1, wherein said lithium bismuth material is sandwiched between layers of said nickel material.

5. A method of producing tritium and retaining substantially all of the tritium so produced within the environment of a fast breeder nuclear reactor which provides neutron radiation during operation thereof, said method comprising:
    (a) providing a housing which is pervious to said neutron radiation at least to a limited extent and substantially impervious to tritium;
    (b) placing within said housing a volume of lithium bismuth material and a volume of nickel material, the nickel material being positioned relative to the lithium bismuth material so as to capture and retain tritium produced by said lithium bismuth material, said nickel material being of sufficiently large volume so as to capture and retain substantially all of the tritium produced by said lithium bismuth; and
    (c) placing said housing containing said lithium bismuth and nickel material within said fast breeder reactor such that the lithium bismuth within the container is subjected to said neutron radiation, whereby the lithium bismuth produces tritium and the nickel material captures and retains substantially all of the tritium so produced.

6. A method as in claim 5, wherein the volume of nickel relative to the lithium bismuth material is defined by the relationship:

$$V(Ni) = \frac{N(_1H^3)}{N(Ni)\epsilon}$$

where $V(Ni)$ is the volume of nickel material needed to dissolve the tritium produced per $cm^3$ of $Li_3Bi$, $N(_1H^3)$ is the amount of tritium produced per $cm^3$ of $Li_3Bi$, $N(Ni)$ is the atomic density of nickel material, and $\epsilon$ is the solubility of tritium in nickel.

7. A method as in claim 5, wherein said housing is formed from a sealed stainless steel tube.

8. A method as in claim 5, wherein said lithium bismuth material is sandwiched between layers of said nickel material.

* * * * *